Sept. 29, 1959  C. B. DALE  2,906,537
RECORD CHANGER
Filed Aug. 21, 1952  6 Sheets-Sheet 6

INVENTOR.
Colin B. Dale
BY
ATTORNEY

United States Patent Office 2,906,537
Patented Sept. 29, 1959

2,906,537

RECORD CHANGER

Colin B. Dale, Oak Park, Ill., assignor to Webcor, Inc., a corporation of Illinois Application August 21, 1952, Serial No. 305,666

12 Claims. (Cl. 274—10)

This invention relates to record changers or players, and particularly to such record playing machines as are capable of manual or automatic record play.

The general object of the invention is to provide a record playing machine which is less costly to make, easier and more convenient to manipulate, and better and quieter operating than other such machines.

An object of the invention is to provide an arrangement of manipulative parts at a common easily accessible location of the machine; specifically, at a front corner of the machine. According to the invention, all manipulations required for manual or automatic record play are made at the common front corner of the machine and the operator need not reach to the back of the machine to set the tone arm in playing position, to operate a reject device, to adjust the turntable speed, to stack records on record discharge means, or to adjust the discharge means for different record sizes.

A feature of the invention is a compact arrangement of parts involving record pusher and reject units with relatively nested shafts.

Another feature of the invention is the provision of a reject shaft which is turnable and also depressible, one such movement being utilized for initiating automatic record play and the other for adjusting turntable speed.

It is also an object of the invention to provide novel set-down positioning means for the tone arm in the form of a stop selectively settable by the record pusher unit.

The invention is also featured by a novel type of record play which may be called semi-manual or semi-automatic play. According to the invention, in this type of play, all that the operator need do is place a record on the turntable and place the tone arm in playing position on the record. All other operations in this type of play will take place without the attention of the operator, including the turning on of the turntable motor and the restoration of the tone arm and the shutting off of the motor.

An object of the invention is to provide a switching means for the turntable motor which will bring the motor into operation in response to removal of the tone arm from a rest position.

It is also intended to provide a novel motor switch operable under control of the reject device or the tone arm.

The invention also provides a novel rotatively mounted record pusher which can be selectively coupled to a rotative device which, at an appropriate time in a change cycle, will be turned to impart a rotative push-off stroke to the record pusher.

The invention also provides bearing means for the tone arm spindle so constructed of resilient material as to prevent wiggle of the spindle or vibration thereof which, if allowed to occur, would result in audible hum or rumble in the speaker.

Further, according to the invention, the turntable will rest through rubber or like resilient material on a thrust bearing which will support the weight of the turntable while rotating. The rubber will absorb or cushion the up and down movement of the turntable which would otherwise result from unevenness in the rolling elements or races of the anti-friction thrust bearing, so that rumble noise from this cause will be eliminated or reduced to a negligible degree.

Another feature of the invention resides in a simple and novel locking means for the tone arm so that it will not swing around and cause damage to itself or the needle when the machine is being transported or assembled into a cabinet or being handled for other than record playing purposes. According to the invention, the record pusher itself may be utilized as a tone arm locking means. Further, according to the invention, the reject device will be disabled while the tone arm is locked, so that the motor cannot be started or a change cycle initiated until the tone arm is released.

Another inventive feature resides in a novel tone arm mounting and actuating assembly involving a tone arm lifter movable axially relative to the tone arm spindle.

Another feature of the invention is the provision of spring means for acting on the tone arm to regulate the needle pressure on a record. According to the invention, the spring means may be adjusted from above the top plate of the machine to adjust the needle pressure and the height of the tone arm.

Another object of the invention is to provide novel drive means for change cycle means. It is intended to drive the cycle means frictionally so as to eliminate gear noises. It is further intended to provide such friction drive by a wheel of rubber or other suitable resilient and cushioning material so as to effect quiet start, run, and stop of the cycling means.

The invention also contemplates novel cycling means in the record playing machine. According to the invention, the cycling means will include a revoluble member which in home position is clear of a drive wheel but which may be moved into peripheral coaction with the wheel to be driven through a revolution back to home position. According to the invention, the revoluble member will have a radial cam shape so as to be shifted bodily in axial position during its revolution and such shift will be utilized to control the horizontal swing of a tone arm and/or the operation of a record discharge unit. Further, the revoluble member will be provided with an up and down cam to control up and down movement of the tone arm during the revolution of the member. Preferably, the up and down movement of the tone arm will be effected through a cam follower mounted on a carrier lever for the revoluble member.

The invention also provides novel trip means for the cyclical means. According to the invention, the trip means will be operable to effect an initial movement of the cyclical means so as to bring it into drive-receiving coaction with a drive element. Further, according to the invention, the trip means will be actuated by a constantly rotating element of the drive means, the rotating element and the trip means being normally out of coaction and movable into coaction when a cycle is to be initiated.

Other objects of the invention will appear from the following detailed description, the claims, and the drawings which show, by way of example, the preferred form of the invention.

Figure 1:
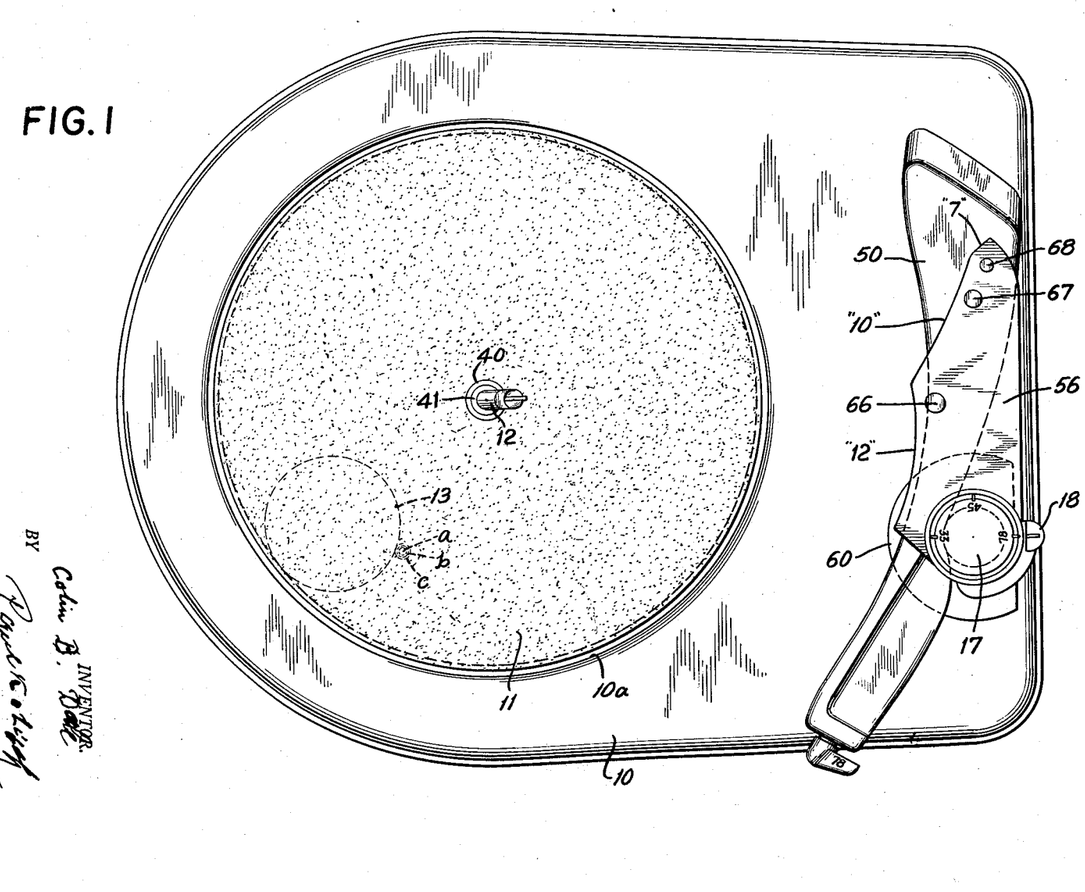
Fig. 1 is a plan view of the machine, showing the record pusher in "12" inch position.
Figure 8:
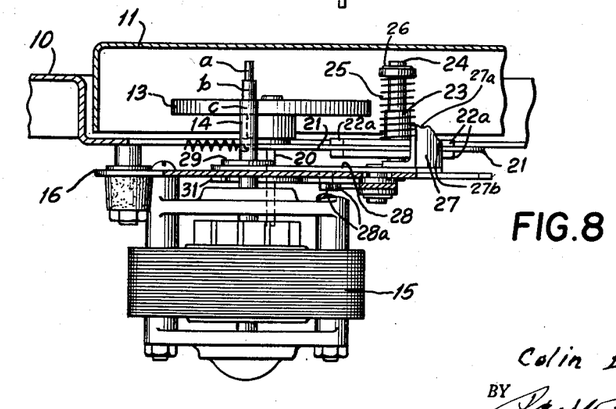
Fig. 8 is a section along line 8—8 of Fig. 2.

Referring first to Fig. 1, the record changer has a platform 10 formed with a circular depression 10a in which a turntable 11 is rotatable about a record spindle 12. Engaged with the inside of the turntable rim is a friction wheel 13 which is selectively driven by one of three drive circles, a, b, and c following each other down on a shaft 14 of a motor 15 (also see Fig. 8). The motor is carried by a plate 16 which is floatingly hung from the platform 10. Drive circles a, b, and c are successively of increasing diameters. When the motor is running and wheel 13 is engaged with circle a, the turntable is driven at 33 r.p.m.; with the wheel engaged with circle b, instead the turntable speed is 45 r.p.m.; and if the wheel is engaged with circle c, then the turntable rotates at 78 r.p.m. Speed selection is made by turning a knob 17 located near the front right hand corner of the platform (see Figs. 1 and 2) to bring the appropriate marking "33," "45," or "78" at the index mark on a member 18.

In shifting the wheel 13 from a smaller drive circle to a larger drive circle, it is required to pass the shoulder or shoulders between such circles. Therefore, the shift will be effected by first moving the wheel 13 sidewise to a position clear of all the drive circles a, b, and c, then moving it vertically to position opposite the desired drive circle, and finally returning it sidewise into engagement with the desired drive circle. The wheel 13 is rotatably held on a spindle 20 which is fixed to a U-shaped slidable plate 21. The legs of the plate 21 are slidably disposed between spaced projections 22a of a casting 22, which thereby bodily and slidably supports the plate 21. Integrally formed with casting 22 is a collar 23 which extends below and above the casting proper. The collar 23 surrounds a pin 24 which rises from motor-mounting plate 16. A spring 25 between the casting and a washer 26 on pin 24 normally urges the casting downwardly. A portion of the collar 23a of the casting 22 proper serves as a follower for a cam 27. The cam is fixed on an arm 28 rotatably mounted on a bushing 29 provided on plate 16 and surrounding, with adequate clearance, the motor shaft 14. Cam 27 is arcuately shaped lengthwise so that when the arm 28 is rocked, the cam edge will move in an arc intersecting the location of cam follower 23a. There are two successively higher cam rises 27b and a on the edge of cam 27. When the arm 28 is in the position shown in Figs. 4 and 8, the cam edge is distant from the cam follower and the cam follower is then resting, under the influence of spring 25, on the surface of arm 28. This defines the bottom position of the cam follower and, therefore, of the assembly of casting 22, slide 21, and friction wheel 13. In this position of the assembly, the wheel 13 is opposite the drive circle c of largest diameter.

Lying against the bottom of the motor-mounting plate 16 (Fig. 4) and pivoted to it at 30 is a lever 31 having its free end engaged with the spindle 20 of wheel 13. The lever 31 is formed with a cam lug 31a to coact with a pair of arcuately spaced pins 28a extending downwardly from the arm 28 through a suitable opening in the plate 16. A spring 33 between slide 21 and plate 16 urges the slide forwardly to engage the spindle 20 with the bottom of the furcation in lever 31. When the cam lug 31a has its peak off either of the pins 28a, the spring 33 is permitted to maintain the spindle 20 in a position in which the wheel 13 is engaged with a drive circle a, b, or c, and effective to transmit rotation to the turntable. When the parts are in the position shown in Figs. 2 and 4, the wheel 13 is engaging drive circle c and the left hand pin 28a of arm 28 is just to the right of the cam lug 31a of lever 31. To shift the wheel into engagement with drive circle b, the knob 17 is turned clockwise to set the indication "45" at the index 18. The knob is fixed to the upper end of a shaft 35 (see Figs. 4 and 7) at the bottom of which is fixed a disk 36 having crank pin connection with a link 37. The link connects the disk to the arm 28. Upon clockwise turning of shaft 35, the link 37 effects counterclockwise motion of the arm 28. Before the first cam rise 27b starts lifting the follower 23a, the left hand pin 28a acts on the cam lug 31a to rock the lever 31 clockwise. The lever, in turn, exerts pressure on the spindle 20 to move the assembly 21, 22, and 13 clockwise about pin 24, at the same time moving the slide 21 rearwardly. The compound motion of the slide displaces the wheel 13 sidewise away from any of the drive circle. When the wheel 13 is in this displaced position, the cam rise 27b starts lifting the follower 23a and the assembly 21, 22, and 13 along the pin 24. By the time the roller is shifted vertically to a position opposite the next drive circle b, the left hand pin 28a starts dropping off the top of the cam lug 31a. As the motion of the arm 28 continues, the cam follower 23a centers itself on the cam rise 27b and the left hand pin 28a moves completely to the left of the cam lug 31a, allowing the spring 33 to move the wheel 13 into engagement with drive circle b. The right hand pin 28a will then be in the same position relative to the cam lug 31a as the left hand pin 28a previously had with respect to the cam lug. Thus, if the knob 17 is turned another step to bring indication "33" at index 18, the right hand pin 28a will coact with lug 31a to shift the wheel 13 sidewise while the cam rise 27a will lift the wheel to a position opposite the drive circle a.

To return the parts to the 45 r.p.m. setting, knob 17 will be turned one step counterclockwise, and to return them to the 78 r.p.m. setting, the knob will be rotated counterclockwise an additional step.

As explained above, the turntable 11 may be selectively rotated at any one of three different speeds. The turntable has a center collar 40 (Figs. 2 and 6) fitting around a bearing sleeve 41 which is secured to the platform 10. The weight of the turntable is supported by a rotatable anti-friction bearing surrounding the sleeve 41 and including a ball cage 42 containing balls 43 which ride between upper and lower washers 44 and 45, the entire ball bearing assembly resting on a flange of sleeve 41. It has been found that microscopic unevenness of the ball surfaces, the ball diameters, and the ball races causes up and down motion of the turntable during its rotation. This up and down motion of the turntable is communicated, during the playing of a record, to the cartridge stylus 50a in the tone arm 50 (also see Figs. 1 and 3) and results in rumble sounds which mar the clarity of the playing. According to the present invention, this difficulty is alleviated by cushioning the turntable so as to absorb the rumble sounds. The cushioning means is embodied in a bushing 51 which is made fast around the reduced lower portion of the turntable collar 40. The bushing 51 is made of resilient material such as rubber and extends past the lower end of the collar 40. Thus, there is no metal-to-metal contact between the turntable and its supporting ball bearing, but there is, instead, contact between the rubber bushing 51 and the ball bearing. The rubber bushing cushions and absorbs the up and down motion of the turntable during its rotation and is effective to eliminate occurrence of rumble sounds otherwise resulting from such up and down motion.

Figure 2:
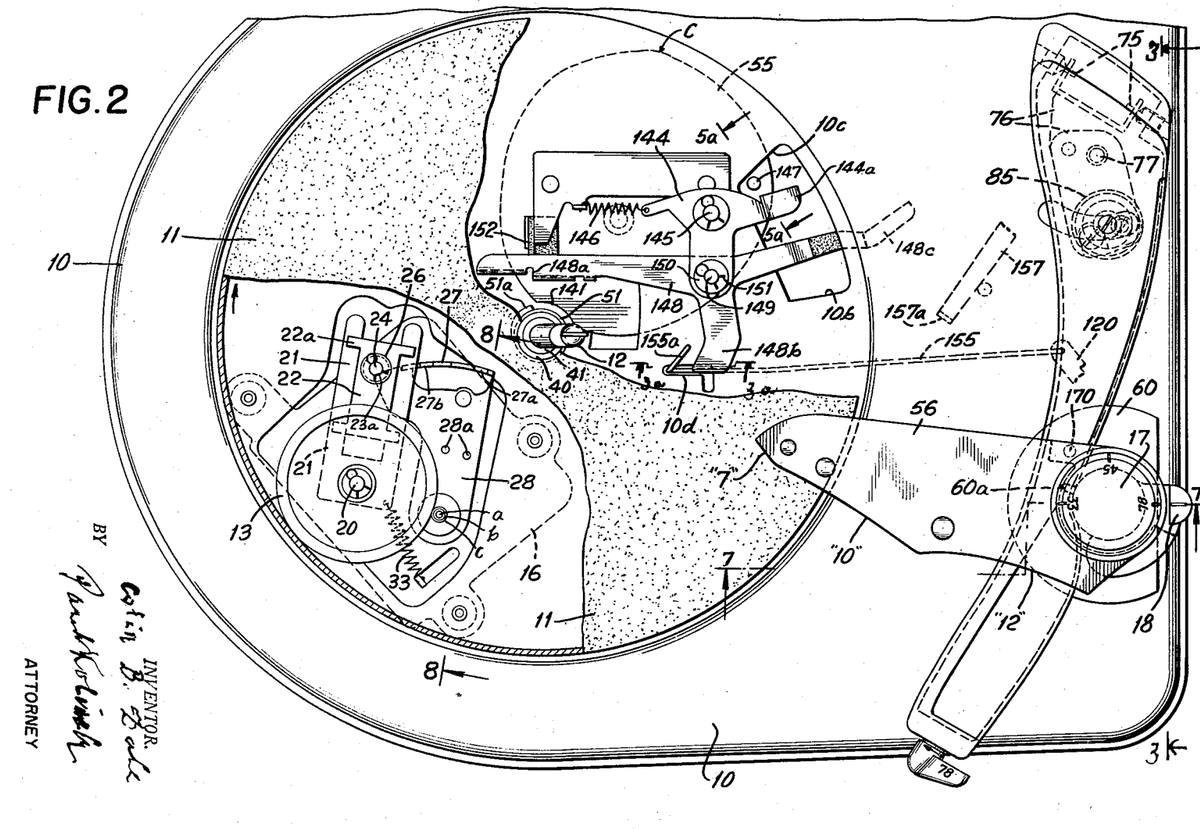
Fig. 2 is a plan view with parts broken out to show interior mechanism and with the pusher in tone arm locking position.
Figures 4, 9A:
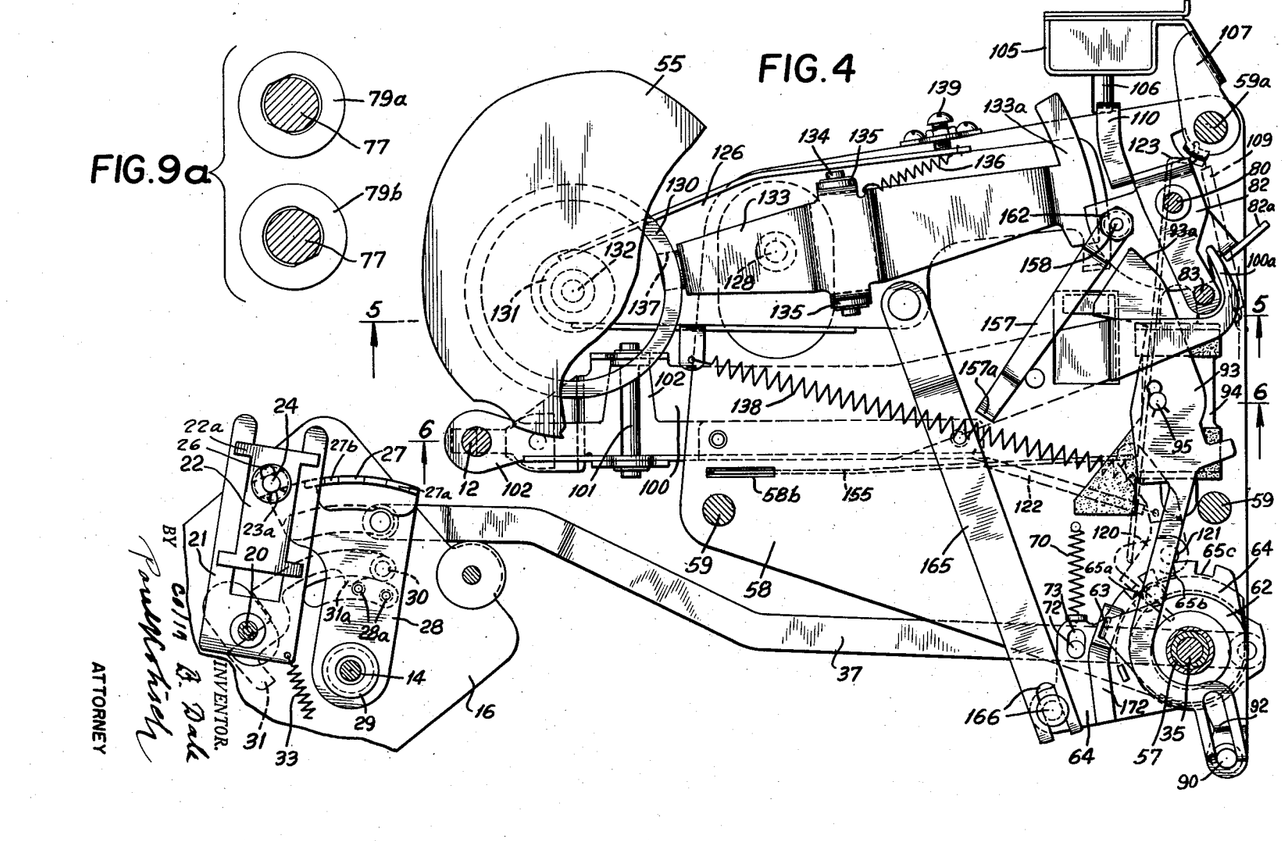
Fig. 4 is a plan sectional view taken generally along line 4—4 of Fig. 3.
Fig. 9a is a sectional view through the upper and lower bearing washers for the tone arm spindle.
Figures 5, 5A, 6:
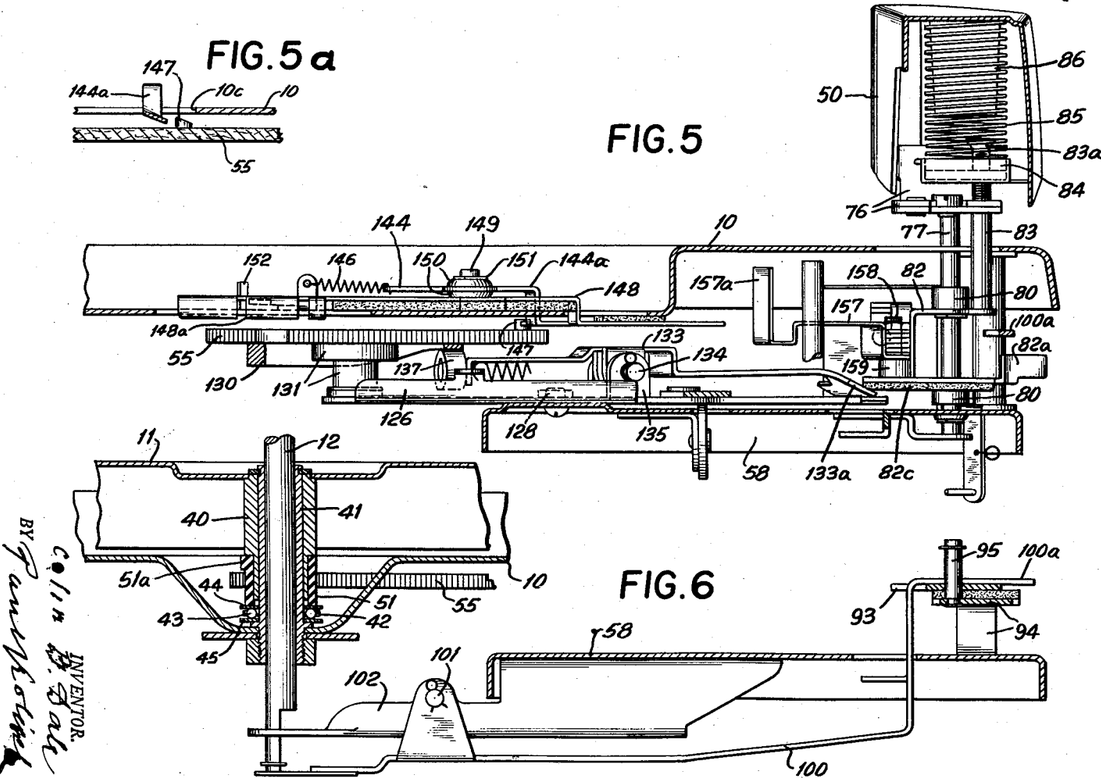
Fig. 5 is a section along line 5—5 of Fig. 4.
Fig. 5a is a view taken along line 5a—5a of Fig. 2.
Fig. 6 is a section along line 6—6 of Fig. 4.
Figures 7, 9:
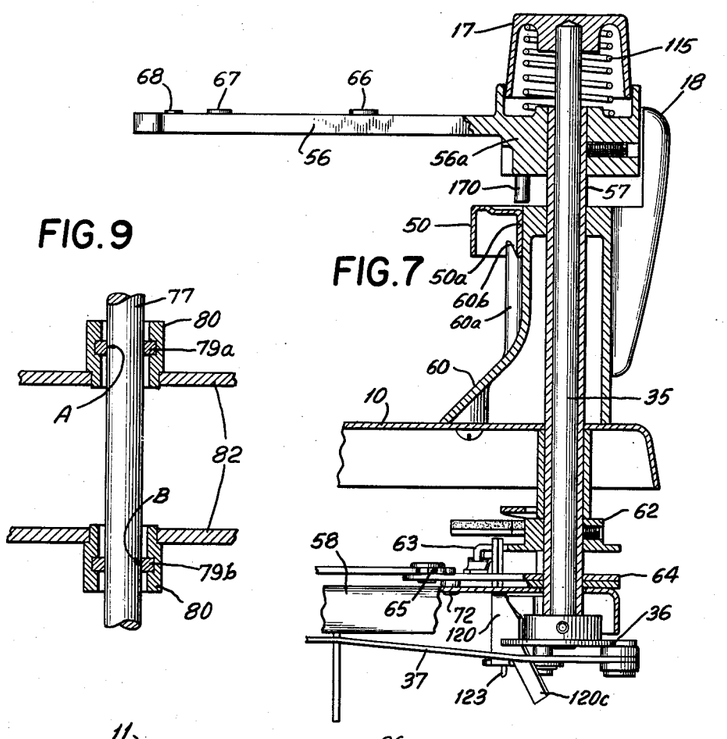
Fig. 7 is a section along line 7—7 of Fig. 2.
Fig. 9 is a sectional view through the tone arm spindle and its bearing means in the tone arm actuator.

The bushing 51 is also a drive member for a cam 55 (see particularly Figs. 2 and 6). During a cycle of the cam 55, the tone arm will be lifted, urged back to off-record home position (Figs. 1 and 2), a next record will be dropped down the spindle 12 onto the turntable, and the tone arm then swung inwardly to a selected set-down position and lowered to set the cartridge stylus down on the record. The cycle involves actuation of the tone arm 50 in timed relation with actuation of a record pusher 56 (Figs. 1, 2 and 7). The hub 56a (Fig. 7) of the pusher is fast to a sleeve 57 surrounding the shaft 35 of the knob 17. Sleeve 57 has rotative bearing and limited vertical play in the platform 10, in a sub-frame 58 (Figs. 3 and 4) dependently secured by posts 59 and 59a to the platform, and in an upright post 60 (Fig. 7) secured to the platform and which, incidentally, carries the speed index member 18. Fixed to the sleeve 57 is a flanged collar 62 provided with a downwardly bent tooth 63. Underneath the collar and resting on the sub-frame 58 is an index member 64 for the pusher 56. The index member is a plate-like lever with three interdental notches 65a, b, and c (Fig. 4) for selectively receiving the tooth 63. The notches define or index three pusher positions relative to record spindle 12 which is of a construction such as disclosed in Patent 2,509,811 for permitting only the bottom record of a stack to be pushed to a drop-down position. In said specification the spindle is constructed near the top with an offset shoulder for supporting a stack of records at their center openings, the peripheral edges being supported by a shelf on a push-off plate located to one side of the machine. The lowermost record is caused to drop down along the cylinder by being pushed off the spindle shoulder by means of the push-off plate. When the tooth 63 is in the notch 65a, the pusher 56 is in Fig. 1 position in which a shelf "12" may coact with the spindle 12 in supporting a stack of 12-inch records, with the bottom one in rim engagement with a push-off pin 66. The operator may lift the pusher to clear the tooth 63 out of notch 65a, then turn the pusher counterclockwise to a position in which the tooth 63 is above the notch 65b, and release the pusher to allow the tooth to drop down into the latter notch. The pusher is then in a second position in which a shelf "10" is closest to the turntable 11 and effective to support the edge of a stack of 10-inch records, with the bottom record in rim engagement with a push-off pin 67. Similarly, the operator may adjust the pusher to a third position in which the tooth 63 is engaged in the notch 65c. In the third position of the pusher, a shelf "7" is closest to the turntable and at a distance from spindle 12 to support a stack of 7-inch records, with the bottom one against a push pin 68.

The pusher 56 is thus coupled in any of three record size supporting positions to the index member 64. A spring 70 normally holds the index member 64 in clockwise position (Fig. 4). During a record change cycle; i.e., a cycle of cam 55, the lever 64, together with the pusher 56 coupled to the lever, will be given a short counterclockwise stroke, causing the active push-off pin 66, 67 or 68, as the case may be, to push the bottom record of a stack to a drop-down position relative to spindle 12.

During the record change cycle, the tone arm 50 also will be given appropriate motions. The tone arm (Figs. 1 to 3, 5 and 7) is generally U-shaped and made of very light-weight material. It is mounted by pins 75 on a bracket 76 in a manner permitting it to rock up or down relative to the bracket but compelling it to swing horizontally with the bracket. The bracket 76 is fixed to the upper end of a vertical spindle 77 having bearing support at its lower end on a frame piece 78 depending from plate 58. The spindle passes loosely through holes in frame plates 10 and 58 and also passes through rubber bearing washers 79a and 79b set in rings 80 (also see Figs. 9 and 9a) which are fixed to the upper and lower legs of a tone arm actuator 82. Rising from the upper leg of actuator 82 is a pin 83 which extends upwardly through a confining hole in the bracket 76. Pin 83 is eccentric relative to spindle 77 so that the bracket 76 and tone arm actuator 82 are connected for common turning movement with the spindle. The upper part of pin 83 is threaded and coacts with a threaded hole eccentrically located in the base of a round cup 84. A screw 83a caps the pin 83. A coil spring 85 is fastened at the bottom into the cup 84 and surrounds a dependent spring-guiding boss 86 provided on the tone arm. Spring 85 applies yieldable balancing leverage to the tone arm, resulting in a needle pressure in the order of about 9 grams. The spring tension and hence the needle pressure can be varied by turning the cup 84 to adjust it along pin 83. To fully expose the cup for manual turning, the tone arm is swung back to withdraw member 86 from spring 85. As the cup is eccentrically mounted on pin 83, it can be turned to adjust the vertical alignment of the spring or its centering position over member 86, as well as to adjust the spring tension. The spring is also a factor in the arrangement and means provided by the present invention for preventing wiggle or vibration of the tone arm assembly and its spindle 77.

In a record changer or record player, the rotation of the drive motor and drive gearing produces vibration of the machine frame. When the tone arm spindle is journalled in conventional bearing means with round bearing holes for the spindle, the vibration of the machine frame is communicated to the spindle. Such vibration of the spindle results in wiggle of the tone arm, the amplitude of the wiggle being proportional to the clearance between the spindle and its bearing means. The wiggle extends along the tone arm to the crystal cartridge, with the result that the needle produces a hum or rumble in a loud speaker at a frequency dependent on the type of motor and its power supply and, in some cases, also affected by the speed of idler means between the motor and turntable. In the embodiment disclosed herein, such hum or rumble is prevented. This is accomplished, in the first instance, by reason of the spindle 77 being journaled in washers 79a and 79b (Figs. 9 and 9a) preferably though not necessarily made of rubber with sufficient pliability to cushion the spindle and absorb vibration of the machine frame. To provide still further reduction of rumble or tendency of the spindle to wiggle, the rubber washers 79a and b are formed with wedge-shaped or tapered bearing holes for the spindle 77. As previously explained, the tone arm 50 is balanced by the spring 85 for the purpose of obtaining a light needle pressure in the order of 9 grams. The weight of the tone arm is about 35 grams. Therefore to lighten the front, needle end of the tone arm, the spring has to push up on the arm with appreciable force. This upward thrust of the spring produces a radial component of pressure of the spindle wedged into the tapered bearing holes. This eliminates rattle or wiggle of the spindle in its bearing holes.

During a record change cycle, the tone arm actuator (Figs. 3, 4 and 5) will first be lifted. The actuator 82 slides free on the tone arm spindle 77. As the actuator 82 rises, it first compresses the spring 85 somewhat and then the cap screw 83a engages the bottom of boss 86 of the tone arm 50, compression of the spring avoiding shock engagement between the screw and the boss. Upon continued rise of the tone arm actuator, it causes the tone arm to swing upwardly on its swivel connection to the bracket 76 and raise the needle or front end clear of any record or records which may lie on the turntable.

After the actuator 82 has been lifted to cause the needle to rise, the actuator will be impositively as by a frictional slip drive 82c turned counterclockwise (Fig.

Figures 3, 3A:
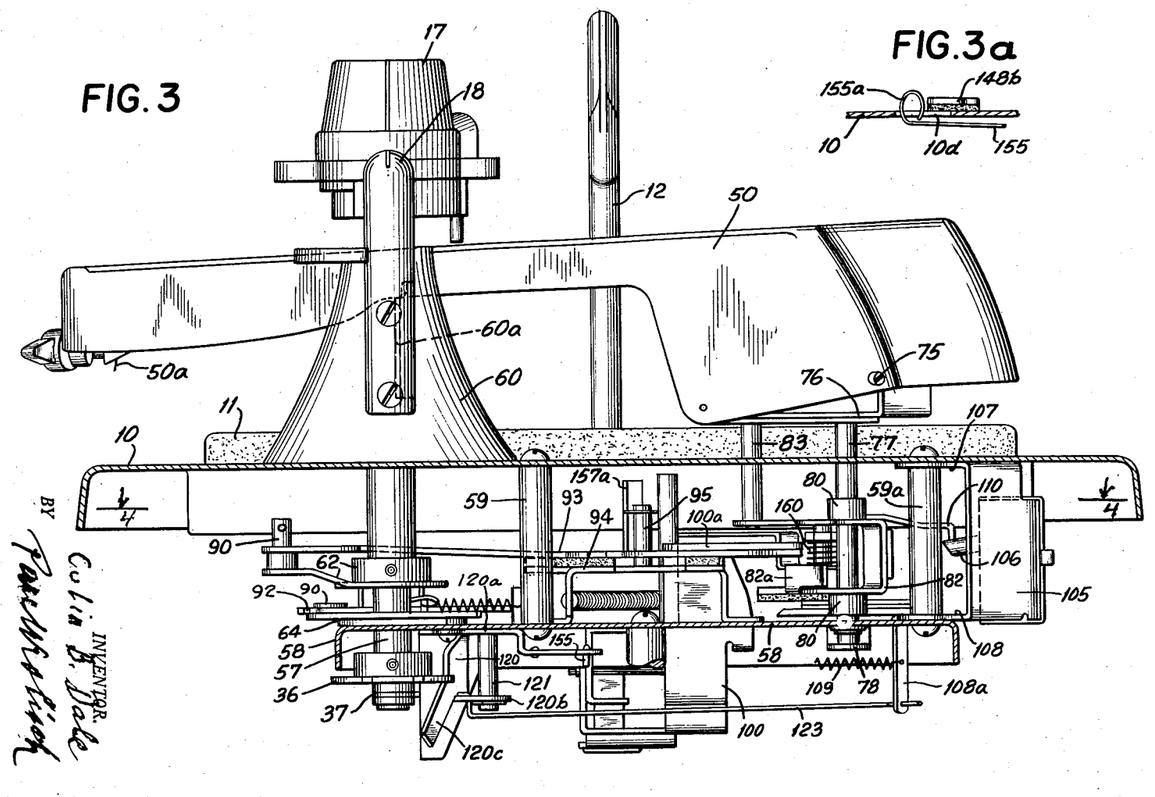
Fig. 3 is a section along line 3—3 of Fig. 2.
Fig. 3a is a section along line 3a—3a of Fig. 2.

4) and through connecting pin 83 produce corresponding turning of the bracket 76 and the tone arm mounted thereon. The tone arm will be swung horizontally, while in raised position, back from over a record on the turntable to home position against the post 60 (Figs. 1 and 2). Pusher 56 will then operate to cause a record to drop on the turntable. After the record has dropped, the actuator 82, still in raised position, will be returned impositively in clockwise direction (Fig. 4) to a selected position in which the tone arm needle will be above a starting or set-down position of the record. The actuator 82 and, thereby, the tone arm will finally be allowed to descend to their normal positions. The set-down position depends on the size of the record to be played. As explained, the pusher 56 has three rotative positions corresponding to the three record sizes (12 inch, 10 inch, and 7 inch). The adjustment of the pusher is utilized in a novel manner and in a novel arrangement to control the set-down position of the tone arm 50. Referring to Figs. 4 and 7, collar 62, fixed to pusher shaft 57, has a crank pin 90 engaged in a slot 92 in the front end of a plate lever 93. The lever lies flat on a bracket 94 secured to sub-frame 58 and is loosely pivoted on a pin 95 rising from the bracket. When the pusher shaft 57 is turned, it is effective through the crank pin 90 to angularly adjust the lever 93 about its pivot 95. Lever 93 may thus be adjusted to an angular position corresponding to the record size position of the pusher 56. An edge 93a of the lever 93 is shaped to serve as a selective stop for the tone arm actuator 82 by coaction with an upwardly bent lug 82a (also see Fig. 5) of the actuator. In the normal down position of the actuator 82, lug 82a is below the plane of the lever 93 (Fig. 3). In the up position of the actuator, the lug is adapted to engage the edge 93a of the lever. The actuator swings clockwise as the needle plays in the record. This occurs while the actuator is in down position, so that the lug 82a freely moves below the lever 93. The rear portion of the lever is wide enough so that the lug 82a while in down position and at the clockwise limit of its travel will still be under the lever and will not pass its left edge. Accordingly, when the actuator 82 is moved up at the start of a cam cycle, preparatory to its counterclockwise return movement, the lug 82a will simply raise the lever 93 along its pivot pin 95 and move back in counterclockwise direction without interference from the lever. At the completion of its return travel, the lug 82a now in up position, has moved from under the lever 93 and to the right of its edge 93a. As the cam cycle continues, the actuator 82, still in up position, is moved clockwise toward a set down position. Upon such movement of the actuator, the lug 82a will encounter a point of lever edge 93a determined by the angular position of the lever 93. With the lever in angular position corresponding to the "12" setting of the pusher 56, the lug 82a will be stopped at one point along the edge 93a (Fig. 4) after the actuator 82 has moved clockwise a distance such that when lowered, the tone arm needle will be set down at the beginning of a 12-inch record. If the lever 93a is adjusted, one step counterclockwise from its "12" position, to the angular position corresponding to "10" inch setting of the pusher, a second point along the lever edge 93a will be in the path of the lug 82a and will stop the inward swing of the tone arm in the proper set-down location for a 10-inch record. Finally, if the lever 93 is moved further counterclockwise to the angular position corresponding to the "7" setting of the pusher, a third point along the lever edge 93a will be effective to stop the inward swing of the tone arm in set-down location for a 7-inch record excursion of the lever 133 that would otherwise be effective to move lug 82a past these points being accommodated by slippage at the friction element 82c.

A last-record lever 100 (Figs. 3, 4 and 6) is provided to arrest any inward travel of the tone arm actuator 82 while in lifted position, if there are no more records supported on the spindle 12. Lever 100 is pivoted on a pin 101 carried by a frame piece 102 mounted on plate 58 and is normally balanced to clockwise position (Fig. 6). When the lever is in this position, the edge of its right hand portion 100a will be in the path of the lug 82a of the raised actuator 82 and will stop any clockwise travel (Fig. 4) of the actuator. The tone arm 50 will therefore remain in stand-by or home position against the post 60. If at least one record is weighing down the spindle 12, it holds lever 100 in its counterclockwise position with its end 100a above the upper locus of the lug 82a so as not to interfere with movement of the tone arm 50 to a set-down position.

Novel means are provided to switch the motor 15 (Fig. 8) on and off. The switching means includes a switch box 105 (Figs. 3 and 4) containing a normally closed switch with a swiveled switch button 106 which protrudes from the box and has a normal up position. The box is pivotally mounted by means of upper and lower ears 107 and 108 on the fixed post 59a. A spring 109 connected to an extension 108a of the lower ear 108 normally maintains the box 105 in the position shown in Fig. 4. When the machine is in stand by condition, the tone arm actuator 82 is down and in the counterclockwise position shown in Fig. 4. An angle piece 110 is attached to actuator 82. When the actuator and the switch box are in their stand by positions, the nose of the piece 110 sits on the button 106, holding it down to keep the motor switch open. Should the actuator be moved to its up position, the piece 110 will allow the button 106 to spring up and the motor switch to close. Release of 110 from the button also may be effected by swinging either the switch box or the actuator 82 away from its home position.

For manual record play, there will be no record weighing down the spindle 12 but the tone arm actuator 82 will be in lower position so that the last-record lever 100 will not interfere with movement of the tone arm inwardly toward a set-down position. Hence, the operator may grasp the tone arm and swing it inwardly out of its rest position against the post 60. According to the present invention, this is sufficient to close the motor switch and start the motor running and no additional manipulation for separately closing the motor switch is here required. Since the tone arm 50 and the actuator are connected for common swinging movement, the inward or clockwise movement of the tone arm to a set-down position is more than sufficient to displace the nose of angle piece 110 from the switch button 106, so that the motor will immediately be brought into operation.

For automatic play, which means playing a stack of records with the machine going through change cycles, the first record play has to be manually initiated. This involves closing of the motor switch and initiation of a change cycle by so-called reject means. According to the present invention, ease of access and economy of structure are obtained by utilizing the change speed control means as manipulative reject means. The change speed control means, as previously described, includes the knob 17 (Figs. 1, 2 and 7), its shaft 35 and the disk 36 at the lower end of the shaft. To change the speed setting, the knob and the attached parts are turned. To perform the reject function, the knob and attached parts are depressed. Knob 17 intrudes into the cup-shaped upper portion of the hub 56a of the pusher 56. Inside the cup and surrounding the shaft 35 is a coil spring 115 which normally holds the knob in up position relative to the pusher shaft 57. The knob may be depressed against the spring resistance to an extent limited by engagement of the knob with the bottom of the cup portion of the hub 56a.

Adjacent the disk 36 is a rocker 120 (Figs. 3, 4 and 7) with ears 120a and 120b mounting the rocker for pivotal movement about a fixed vertical pin 121. The rocker is formed with a downwardly inclined finger 120c. A spring 122 (Fig. 4) normally urges the rocker counter-clockwise as viewed in Fig. 4, maintaining the finger 120c against the arcuate edge of the disk 36. The angular lie of the finger against the edge of disk 36 is such that when the disk is moved down by the depression of the knob 17, the disk cams on the finger to produce counter-clockwise turning of the rocker 120, as viewed in Fig. 4. The rocker has a lost motion connection to the switch box 105, such as afforded by the wire link 123. The left end of the link (Fig. 3) is hooked to the ear 120b of the rocker for push or pull actuation by the rocker. The right end of the link passes loosely through a hole in the extension 108a of the switch box and is bent in front of the extension to provide a push connection only between the link and the extension. When the knob 17 is depressed to initiate first record play of a stack of records, it moves the disk 36 down to its lowermost position, causing the disk to cam the finger 120c and the rocker 120 clockwise (Fig. 4). The wire link 123 thereupon pushes the switch box 105 clockwise to remove the switch button from under the nose of the angle piece 110. The motor switch closes and the motor 15 (Fig. 8) starts running.

The same depression of the knob 17 also initiates a change cycle. The change cycle means includes the cam 55 (Fig. 4) which is part of a rigid cam assembly bodily and rotatably mounted on a support lever 126. The lever 126 is horizontally swingable on a fixed pivot 128. Besides the cam 55, the cam assembly includes a face cam 130 and a hub 131, the hub resting on the lever 126 and journaled on an upright pin 132 rising from the lever. Also bodily carried on the lever 126 is a follower lever 133 vertically rockable on a pin 134 which is supported between ears 135 of the lever 126. A spring 136 (Fig. 4) between the levers 126 and 133 urges the lever 133 in a direction to keep the follower roller 137 (also see Fig. 5) firm against the cam 130. The lever 126 is urged counter-clockwise by a spring 138 to abut an adjustable stop screw 139.

The cam 55 has a peripheral notch 141 so curved that when the cam is in home position, the notch is concentric with and clears the rubber drive bushing 51 on the turntable hub (see Figs. 2 and 6). The turntable then rotates without disturbing the cam 55, since the drive bushing does not touch any point of the cam periphery. To couple the cam to the drive bushing, trip mechanism is operated to push the cam counterclockwise an initial distance which is enough to bring a point of the cam periphery into engagement with the bushing 51. The trip mechanism includes a push lever 144 (Figs. 2 and 5) pivoted on a pin 145 to the top of the platform 10 and normally centered in the position shown in Fig. 2 by means of a spring 146. One lever arm 144a bends down intermediately through an opening 10b in the platform and then extends forwardly to a horizontal location just above the cam 55. Projecting upwardly from the cam is a short pin 147 with an inclined head (also see Fig. 5a). When the cam is in home position, the pin 147 is a short distance past the arm 144a. The lever 144 can be rocked counterclockwise (Fig. 2) until the vertical bend in arm 144a strikes the edge 10c. Upon such movement of the lever 144, the free end 144a pushes against pin 147 to effect the initial counterclockwise displacement of the cam needed to couple the cam for peripheral drive by the bushing 51. Near the end of the ensuing revolution of the cam, the inclined top of pin 147 cams past the underside of the laterally inclined free end of 144a (see Fig. 5a) to return to its original position. At the end of the revolution of cam 55, the notch 141 is again concentric to the bushing and drive of the cam ceases with the cam back in home position.

Suspended from lever 144 is a trip lever 148 having a pivot pin 149 which passes through a rubber collar 150 attached to lever 144. The pivot pin 149 is retained in the collar by a spring clip 151 which snaps into a groove in the pivot pin in the customary manner. The underside of the trip lever is felted and rests on the platform 10 which bears the weight of the lever. One arm of the trip lever extends leftward from the pivot 149 and is formed with a shoulder 148a which, upon counterclockwise swing of the trip lever relative to the lever 144, moves into the path of the abrupt side of a lug 51a integral with the bushing 51 (see Figs. 2 and 6). The lug will then strike the shoulder 148a during a rotation of the bushing 51 and propel the trip lever bodily to the right (Fig. 2). As a result, the trip lever will effect the counterclockwise action of the lever 144 which, as described before, pushes the cam 55 into drivable engagement with the bushing 51. During this action of the lever 144, the spring 146 stretches. As soon as the lug 51a disengages the shoulder 148a, the spring recoils and snaps the lever 144 back in clockwise direction. Since the trip lever 148 is bodily mounted to the lever 144, the velocity of return of the lever 144 is imparted to the trip lever causing the latter to swing by momentum clockwise relative to the lever 144 until stopped by a felted stop 152. This action of the trip lever is aided by the friction between the clockwise moving rubber collar 150 and the trip lever. With the trip lever back in original position, its shoulder 148a is remote from the path of rotation of lug 51a.

Actuation of the trip lever 148 to trip position may be effected manually as a result of depression of the knob 17 for initiating first record play of a stack of records. As described before, when the knob is depressed, the disk 36 cams the rocker 120 clockwise (Fig. 4) to serve via the link 123 to displace the switch box 105 so that the motor switch can close. The clockwise stroke of the rocker 120 also serves via a wire link 155 to set the trip lever in trip position. The link 155 is hooked at its right end to the rocker 120 (Figs. 2 and 4) and is shaped to pass under the sub-frame 58 and up through a slot 58b therein and through a slot 10d (Figs. 2 and 3a) in the platform 10. The link terminates above the platform in a hook 155a in front of the arm 148b of the trip lever. When the rocker 120 is moved clockwise (Fig. 4), it moves the link 155 to the right, causing the hook end 155a to strike the arm 148b and swing the trip lever into trip position.

The trip lever 148 will also be swung into trip position automatically at the end of the playing of a record, irrespective of whether manual or automatic play is taking place. The automatic actuator for the trip lever comprises an arm 157 with a vertical finger 157a at its free end (see Figs. 2, 4 and 5). The arm 157 at its other end is freely pivoted on a pin 158 which is rigid with a stud 159 integral with the tone arm actuator 82. A spring 160 (also see Fig. 3), surrounding pin 158, presses the pivoted end of the arm 157 into light frictional engagement with the top of the stud 159, friction being adjustable by turning a nut 162 on the threaded upper portion of the pivot 158. The arm 148c of the trip lever is bent down through the opening 10b in platform 10 into the path of the finger 157a and felted on its upper side. As the actuator 82 moves inwardly with the tone arm 50 during playing of a record, the finger 157a approaches the trip lever arm 148c. When the needle in the tone arm has finished playing a record and starts traveling in the steeper finish groove of the record, the actuator 82 starts swinging inwardly rapidly and finger 157a strikes the lever arm 148c with sufficient force to set the trip lever 148 in trip position. A change cycle is thereby initiated for returning the tone arm to its idle position. This occurs whether automatic or manual play is taking place.

No special setting is needed with the disclosed apparatus for selecting manual or automatic play. For manual play, of course, no records will be placed on the spindle 12. The operator need only place the tone arm in a set-down position on a record on the turntable to cause the motor to start running, as previously described. At the finish of the play, the finger 157a will act on the trip lever 148 to initiate a change cycle for returning the tone arm to idle position and the motor will be automatically stopped, for reasons which will appear later. To play the next record, the operator must again move the tone arm to a set-down position. If automatic play is desired, the operator need only place a record or stack of records on the spindle 12 and the pusher plate 56 and then depress the knob 17. The depression of the knob initiates a change cycle and closes the motor switch, as already described. During the cycle, the bottom record of the stack is discharged on the turntable 11 and the tone arm is brought to playing position. At the end of record play, the change cycle means is automatically tripped for a cycle, restoring the tone arm, causing the next record to be discharged, and the tone arm to be swung inwardly to a set-down position and lowered onto the record. This procedure repeats automatically until the tone arm is restored following last record play. The last-record lever 100 then prevents the tone arm being swung again to set-down position, in this respect there being no distinction between last record play and manual play.

The change cycle begins when the cam 55 is tripped into edge engagement with the drive bushing 51. The bushing, rotating clockwise, then drives the assembly of cams 55 and 130 counterclockwise through one revolution. During the first quarter of the revolution, the up and down cam 130 rocks the follower 133 counterclockwise (Fig. 5). The right end 133a of the follower rises and engages the friction pad 82c at the bottom of tone arm actuator 82, lifting the actuator to its up position. Through the spring 85, the actuator 82 swings the tone arm 50 up, bringing the needle clear above the plane of any record or stack of records on the turntable. The cam 130 maintains the follower 133 in the actuated position until an appropriate point of the final quarter of the cam revolution and then allows the spring 136 (see Fig. 4) to restore the follower. Consequently, during the final quarter of the cycle, the actuator 82 descends to its low position, permitting the needle end of the tone arm to drop down on the record.

The cam 55 is shaped on its driven edge to allow the horizontally rockable carrier 126 to idle until after the tone arm actuator 82 has been moved to substantially its upper position during the first quarter of the cycle. In the second quarter, a rise of the cam 55 edge coacts with the drive bushing 51, so that as the cam turns, it is also forced back to rock the carrier 126 clockwise (Fig. 4). Slave lever 133 mounted on 126 moves bodily clockwise with 126 and lever end 133a, therefore frictionally or impositively impels pad 82c in a horizontal direction which produces counterclockwise swing of actuator 82. The tone arm 50, now elevated at its needle end, swings with the actuator 82 back to home position at the post 60.

In the later portion of the 2nd quarter of the cycle, after the tone arm has been swung back sufficiently to clear the path of discharge of a record from a stack edge-supported by the pusher 56, continued clockwise movement of the carrier 126 results in operation of the pusher to discharge a record. Operation of the pusher is effected by carrier 126 through a link 165 which is pivotally connected at one end to the carrier and has a pin-and-slot connection 166 at the other end to the plate lever 64 to which the pusher assembly is coupled in one of three record-size positions, as previously described. As the carrier 126 completes its clockwise or forward stroke, the link 165 actuates lever 64 counterclockwise. Accordingly, the pusher 56 discharges the bottom record of the stack supported between the pusher and the spindle 12.

In the 3rd quarter of the change cycle, a receding portion of the cam 55 edge coacts with drive bushing 51. Hence, as the cam is turned, it also moves forwardly, allowing the spring 138 to restore the carrier 126 counterclockwise to its original position against stop 139. Slave lever 133 moves counterclockwise bodily with the carrier, so that the frictional drag of lever end 133a on pad 82c is in a horizontal direction such as to produce clockwise swing of the tone arm actuator 82. The actuator swings in this direction until its lug 82a abuts edge 93a of the lever 93 which has been set by the pusher assembly in an appropriate set-down selecting position. Accordingly, the tone arm, still elevated, swings inwardly with the actuator 82 to a selected set-down location.

In the 4th quarter of the cycle, the up and down cam 130 permits the spring 136 (Fig. 4) to restore the follower 133 clockwise (Fig. 5) relative to carrier 126. Consequently, lever end 133a descends, actuator 82 drops to its low position and the tone arm is lowered to place the needle in record playing position.

At the end of the cycle, the follower roller 137 is in a valley of cam 130 and serves to prevent overthrow of the cam assembly past home position as the notch 141 of cam 55 returns to concentricity with drive bushing 51.

If the change cycle occurs at the end of last record play, or after a manual play, the last-record lever 100 arrests the actuator 82 in its counterclockwise home position, stopping it from being swung clockwise by lever end 133a during the 3rd quarter of the cycle. Consequently, when the actuator 82 drops in the 4th quarter of the cycle, the angle piece 110 descends on the switch button 106 and opens the motor switch, whereupon the motor 15 (Fig. 8) stops running.

The edge of the cam 55 may be roughened, as indicated in Fig. 6, between the left end of the notch 141 and the point C (Fig. 2), in order to increase the positiveness of drive by the bushing 51 in the first half of the cycle.

It is to be noted that the present invention dispenses with toothed gearing for driving the cam assembly and the cycle means collectively. Since the drive is effected frictionally by means of the rubber bushing 51, all gear noises are eliminated and the cycle "start," "run," and "stop" are quiet because of this rubber drive.

It is desirable at times, as during transportation of the machine, to hold the tone arm 50 latched so that it will not swing around and be damaged or have its needle damaged. The invention is featured by novel locking means for captivating the tone arm in home position, when so desired, and for preventing starting of the motor or initiation of a change cycle while the tone arm is captivated. The post 60 has an integral fin 60a (Figs. 2, 3 and 7) which is angled down at the top to provide a notch 60b. The tone arm is a channeled member and when in home position, the right channel side 50a seats in the notch 60b. To lock the tone arm in this position, the pusher 56 is turned to a fourth position additional to its three record-size positions. The fourth position is shown in Fig. 2. In this locking position, a pin 170 depending from the pusher hub 56a is over the tone arm and prevents the tone arm from being lifted out of the notch 60b. To set the pusher in its fourth, tone arm locking position, it is first lifted to release the tooth 63 from a notch 65a, b, or c (Fig. 4) and is then turned to the locking position. As the pusher comes into this position, the tooth 63 rides up the inclined free end of a leaf spring 172 and snaps into spring-latched position on top of the leaf spring. With the tooth 63 sitting on leaf spring 172, the pusher assembly is being thereby supported in elevated position above the position it occupies when the tooth 63 is in a notch 65 and the pusher is in one of its three record-size positions. Correspondingly, when the pusher is at an elevation above its normal up position, it acts through spring 115 to raise the knob 17 above the normal up position of the knob. Accordingly, the disk 36 is higher up on the finger 120c, allowing the spring 122 to maintain the rocker 120 counterclockwise (as viewed in Fig. 4) beyond its normal position. With the rocker further counterclockwise than normal, it sets the lateral bend at the right end (Fig. 3) of wire link 123 at an increased distance from the front of the switch box extension 108a and also sets the hook end 155a of the wire link 155 at an increased distance from the trip lever arm 148a (Figs. 2 and 3a). Should the knob 17 now be depressed, the disk 36 will not move down far enough and the rocker 120 consequently will not be actuated clockwise (Fig. 4) far enough to cause the wire link 123 to displace the switch box 105 or to cause the wire link 155 to rock the trip lever 148 to tripping position. In this manner, when the pusher is in locking position for the tone arm, it inhibits the closing of the motor switch and the initiation of a change cycle.

Attention is called to the novel arrangement of all the manipulative elements in readily accessible substantially common location at the front of the machine. The tone arm extends to the front right corner of the platform 10 and may be grasped there to be set in playing position. The record pusher is accessible adjacent the front right corner of the machine for adjustment and for receiving a stack of records. The knob 17 is also accessible at the front right corner of the machine for speed adjustment and for depression to perform its reject function. Thus, in the normal use of the machine, the operator need never reach to the back of the machine to effect any manipulations, which is an extremely important consideration when the record changer is mounted, as it usually is, in a cabinet.

What is claimed is:

1. A record player including a turntable, a tone arm and a cycling mechanism to move the tone arm from its resting position to a playing position, a drive motor therefor, a first member pivotally mounted and carrying a normally closed type of motor switch provided with a switch button, a switch opening member movable to engage with said switch button to hold the switch open, means mounting said first member for movement relative to said switch opening member to disengage the switch button from the switch opening member so as to permit the switch to close and set the motor and thereby the turntable in rotation, means for actuating said cycling mechanism to move the tone arm from its rest position to a record playing position, and an operative connection between the tone arm and said switch opening member for moving said switch opening member into button engaging position on the resting position of the tone arm and upon movement of the tone arm from its rest position to disengage said member, whereby the turntable starts running without further attention from the operator.

2. In a record changer; a tone arm having a rest position, cycling means effective during a cycle to move the tone arm from rest position to record playing position, a cycle trip device, a reject unit depressible from a normal up position to an effective down position, a push connection between the reject unit and the cycle trip device effective upon the depression of the reject unit to said down position for rendering the trip device capable of initiating a cycle of the cycling means, a tone arm locking means for locking the tone arm in its rest position actuated by said reject unit when elevated above its normal position, said locking means including a rotational latch supporting said reject unit in its elevated position against being depressed and thereby preventing said push connection from rendering the trip device capable of initiating a cycle.

3. In a record player having cycle means adapted to actuate a tone arm, a drive wheel concentrically mounted on a turntable shaft, a cam member in home position rotatably mounted on a horizontally movable member axially displaced from said shaft, a lever pivoted for vertical movement on and movable laterally with said movable member, said cam member being adapted to effect camming in a substantially horizontal plane and including a vertical camming surface actuating said pivoted lever for movement in a vertical plane, the periphery of said cam member being interrupted by a recess into which said drive wheel intrudes with clearance while the cam member is at home position, a tone arm lifted and rotated by said pivoted lever, and a lever assembly tripping means actuated by said tone arm to bring the cam member into peripheral drive engagement with said drive wheel to drive said cam through a revolution back to its home position, whereby the tone arm is urged through a substantially vertical and horizontal movement cycle during a complete revolution of the cam member.

4. In a record player as in claim 3, a lever assembly tripping means effective to shift the recess of the cam member past the drive wheel comprising a first lever, a second lever pivoted on an arm of the first lever, a rotating actuator projecting from one side of the drive wheel for actuating the second lever, said second lever being normally out of path of the rotating actuator, and cycling initiating means to rock said second lever into the path of said actuator, impact of the actuator upon the second lever displacing said first lever, and means carried by said cam member actuated by said displaced first lever to push the revoluble cam member into peripheral engagement with the drive wheel.

5. The combination called for in claim 4 in which said cycling initiating means includes an actuating element driven by said tone arm as the tone arm approaches the axis of rotation of the turntable.

6. The combination called for in claim 3 in which said cycling initiating means includes a manually operated reject member.

7. A record changer for manual or automatic record play, comprising a frame, a turntable mounted for rotation upon the frame, means for rotating said turntable including an electric motor and a speed hcanging mechanism, a record discharge unit mounted on the frame for discharging a record to the turntable during automatic play, tone arm means extending horizontally in its resting position to an easily accessible station for lateral movement by hand between its resting position and a record playing position during manual record play, a manually actuatable means accessible at said location for operating said speed changing mechanism to select the desired speed setting in relationship to the size of the record discharged by said discharge unit, reject means at said location controlled by said manually actuatable means for initiating automatic record play, an on-off switch for said motor, means operated by said reject means for closing said switch during manipulation of said manually actuatable means, and means carried by said tone arm for actuating said switch when said tone arm is moved laterally from its resting position whereby the manipulative means required for manual and automatic record play at selectable speed are disposed at the common easily accessible location of the record changer for manipulation.

8. In a record changer with change cycle means and a variable speed turntable; a manual member, a shaft carrying said member, means mounting said shaft for movement in either rotative or axial direction, speed control means for the turntable, means whereby said speed control means is adjusted by rotation of the shaft by said member, cycle trip means, and means connecting said cycle trip means to said shaft whereby said cycle trip means is made effective by actuation of the shaft in an axial direction by said member.

9. In a record changer with change cycle means and a variable speed turntable; a manual member, a first shaft carrying said member, means mounting said shaft for movement in either rotative or axial direction, a record discharge pusher, and a second shaft therefor connected to the cycle means for operation of the pusher during a change cycle, speed control means for the turntable, means whereby said speed control means is adjusted by rotation of the first shaft by said member, cycle trip means, and means connecting said cycle trip means to said first shaft whereby said cycle trip means is made effective by actuation of the shaft in an axial direction by said member, the shafts of the said member and of said pusher being disposed coaxially and carrying the member and pusher in vertically spaced positions, one above the other.

10. In a record changer capable of automatic record play by a tone arm of successive records discharged upon a motor-driven turntable; a motor switch having a switch button, a rockable switch box mounting said switch and button, means carried by said tone arm for engaging the button to hold the switch open when the tone arm is in its outermost raised position, and a reject device manually operable to initiate automatic record play and connected to the switch box to rock it and said button away from said means for disengaging the button from said means and causing the switch to close and set the motor in operation concurrently with the initiation of automatic play by the reject device.

11. In a record player as in claim 3 including rotatable means mounted for vertical movement for raising, swinging and lowering the tone arm, and in which the pivoted lever has an element to engage said rotatable means and drive it in a horizontal plane in conjunction with the horizontal movement of said horizontally movable member, said element being vertically movable with said pivoted lever to raise and lower the tone arm in conjunction with the rocking movement of the pivoted lever with the action imparted thereto by said vertical camming surface.

12. In a record changer for manual or automatic play of records on a turntable; a platform accommodating the turntable with a shouldered spindle for receiving records, means for rotating said turntable at different speeds including a speed changer mechanism and a manual element above said platform located at one front corner thereof for controlling said speed changer mechanism, switch means for starting and stopping said turntable rotating means, a record support and drop mechanism for supporting a stack of records above the turntable and including a push-off device pivotally mounted above the platform to deposit a record on the turntable and including an element contacted by a record being dropped and coordinated to records of different sizes, cycling means for operating the push-off device during automatic play, a reject device including a connection controlling said switch means and a connection controlling said cycling means, said reject device being actuated by said manual element for initiating a cycle of the cycling means, and a tone arm extending to said one front corner for manipulation from a rest position at said corner into a record playing position during manual play including a connection controlling said switch means, whereby the manipulative controls required for manual and automatic play of a record deposited on the turntable are located at said one front corner of the platform.

References Cited in the file of this patent

UNITED STATES PATENTS

| | | |
|---|---|---|
| 1,820,154 | Peets | Aug. 25, 1931 |
| 2,307,030 | Erwood | Jan. 5, 1943 |
| 2,330,293 | Knox | Sept. 28, 1943 |
| 2,331,383 | Faulkner | Oct. 12, 1943 |
| 2,333,414 | De Tar | Nov. 2, 1943 |
| 2,353,763 | Rodman | July 18, 1944 |
| 2,371,362 | Small | Mar. 13, 1945 |
| 2,402,150 | Dale | June 18, 1946 |
| 2,421,909 | Roe | June 10, 1947 |
| 2,435,264 | Ansar | Feb. 3, 1948 |
| 2,438,264 | Bender | Mar. 23, 1948 |
| 2,519,579 | Johnson | Aug. 22, 1950 |
| 2,545,643 | Bender | Mar. 20, 1951 |
| 2,587,677 | Ammlung | Mar. 4, 1952 |
| 2,594,246 | Ten Cate | Apr. 22, 1952 |
| 2,614,847 | Johnson | Oct. 21, 1952 |
| 2,651,524 | Miller et al. | Sept. 8, 1953 |
| 2,652,258 | Dale et al. | Sept. 15, 1953 |
| 2,677,549 | Burt | May 4, 1954 |
| 2,695,786 | Vistain | Nov. 30, 1954 |
| 2,732,212 | Carson | Jan. 24, 1956 |

FOREIGN PATENTS

| | | |
|---|---|---|
| 429,635 | Great Britain | June 4, 1935 |
| 235,600 | Switzerland | June 1, 1945 |

OTHER REFERENCES

Philco Service Manual, Model M–22 Record Changer, 1950, Philco Corp., Philadelphia, Pa., 15 pages, especially pages 5 and 9.